United States Patent

Oono et al.

[11] Patent Number: 5,926,324
[45] Date of Patent: Jul. 20, 1999

[54] MOTOR DRIVEN DIAPHRAGM APPARATUS FOR LENS BARREL

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kabushiki Kaisha, Tokyo, Japan

[21] Appl. No.: 08/987,083

[22] Filed: Dec. 9, 1997

[30] Foreign Application Priority Data

Dec. 10, 1996 [JP] Japan ................................ 8-329891

[51] Int. Cl.⁶ .................................................. G02B 15/14
[52] U.S. Cl. ........................................ 359/696; 359/694
[58] Field of Search ...................... 359/696, 704, 359/739, 748, 819, 702, 703, 694

[56] References Cited

U.S. PATENT DOCUMENTS 5,724,194  3/1998  Ishikawa ........................ 359/696

Primary Examiner—Hung Xuan Dang
Attorney, Agent, or Firm—Greenblum & Bernstein, P.L.C.

[57] ABSTRACT

A motor-driven diaphragm apparatus for a lens barrel having a plurality of lens groups and a diaphragm mechanism, in which a diaphragm block provided with a plurality of diaphragm blades and a diaphragm-opening-and-closing ring which opens and closes an aperture defined by the diaphragm blades, is integrally provided with a diaphragm-opening-and-closing arm that projects from the diaphragm block and that is provided with a radial association groove for the diaphragm-opening-and-closing ring. Also provided are front and rear lens barrel blocks which support the lens groups, wherein said diaphragm block is held between the front and rear lens barrel blocks so that the diaphragm-opening-and-closing arm and the association groove project outwardly.

4 Claims, 18 Drawing Sheets

MOTOR DRIVEN DIAPHRAGM APPARATUS FOR LENS BARREL

BACKGROUND OF THE INVENTION

1. Field of the Invention

The present invention relates to a motor-driven diaphragm apparatus for a lens barrel.

2. Description of the Related Art

Upon assembling a known lens barrel, the diaphragm mechanism is incorporated in the lens barrel at the same time as the lens is incorporated in the lens barrel. Namely, it is difficult to make the diaphragm mechanism as a sub-assembly.

SUMMARY OF THE INVENTION

It is an object of the present invention to provide a motor-driven diaphragm mechanism which can be sub-assembled as a unit separate from the lens barrel.

To achieve the object mentioned above, according to the basic concept of the present invention, the diaphragm drive apparatus is composed of two separate units, i.e., a mechanism portion for opening and closing the diaphragm blades and a drive portion therefor, and the two units are individually secured in association with each other. Namely, according to the present invention, there is provided a motor-driven diaphragm apparatus for a lens barrel having a plurality of lens groups and a diaphragm mechanism, comprising: a diaphragm block provided with a plurality of diaphragm blades and a diaphragm-opening-and-closing ring which opens and closes the diaphragm blades, said diaphragm-opening-and-closing ring being integrally provided with a diaphragm-opening-and-closing arm that projects from the diaphragm block and that is provided with a radial association groove for the diaphragm-opening-and-closing ring; front and rear lens barrel blocks which support the lens groups, said diaphragm block being held between the front and rear lens barrel blocks so that the diaphragm-opening-and-closing arm and the association groove project outward; and a diaphragm drive unit separate from the diaphragm block and the front and rear lens barrel blocks having an association pin which can be fitted in the association groove of the diaphragm-opening-and-closing arm and a drive system including a motor for driving the association pin, said diaphragm drive unit being secured to the front or rear lens barrel block so that the association pin is fitted in the association groove of the diaphragm-opening-and-closing arm of the diaphragm block.

The diaphragm block can be provided with a substrate which is held between the front and rear lens barrel blocks and which is provided with an insertion hole in which a guide rod extends to guide the lens groups to move linearly. Consequently, for example, the lens groups can be linearly moved on the front and rear sides of the substrate. The present disclosure relates to subject matter contained in Japanese Patent Application No.8-329891 (filed on Dec. 10, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 6:
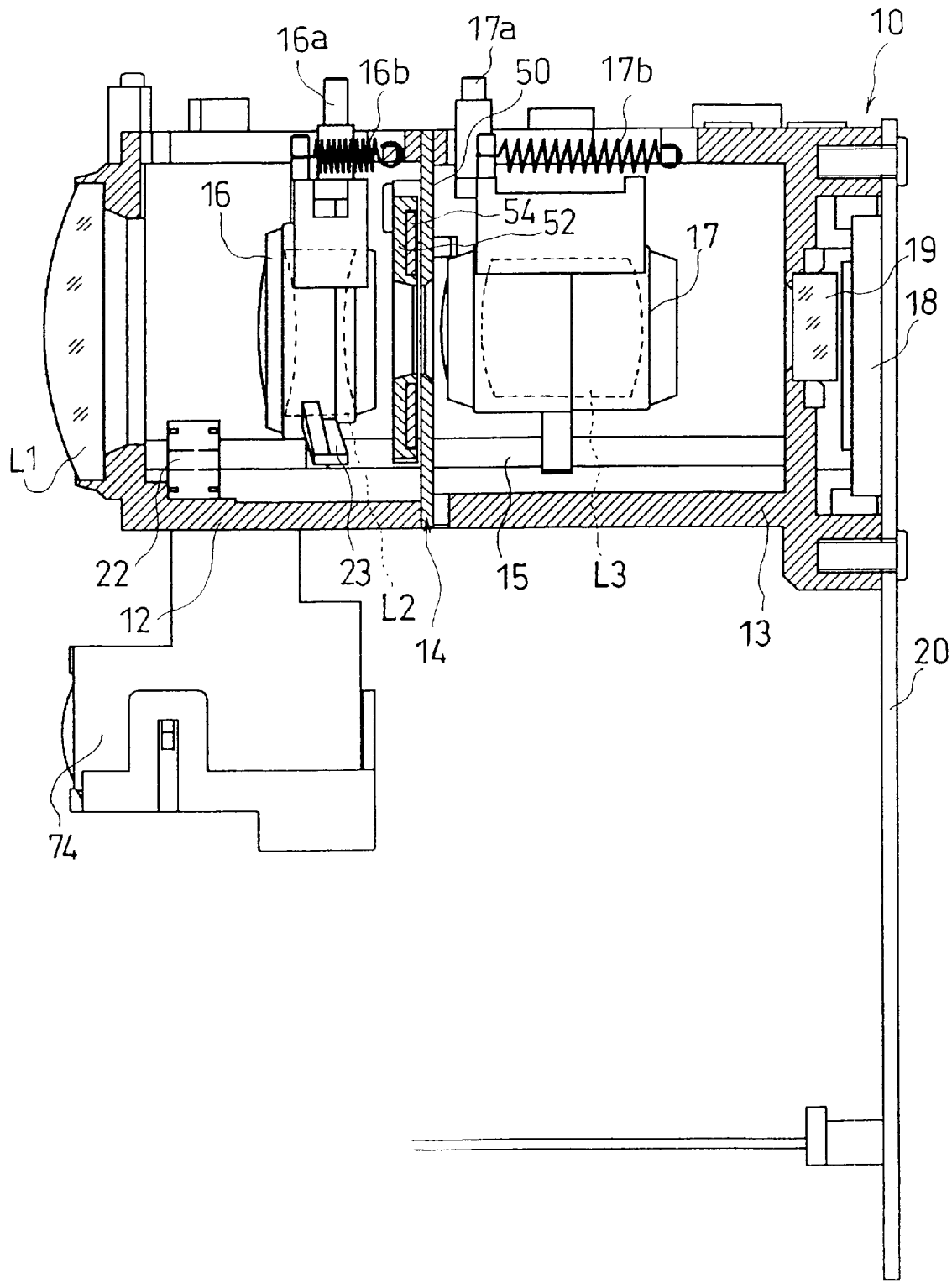
FIG. 6 is a longitudinal sectional view of FIG. 5 at a telephoto extremity.
Figure 7:
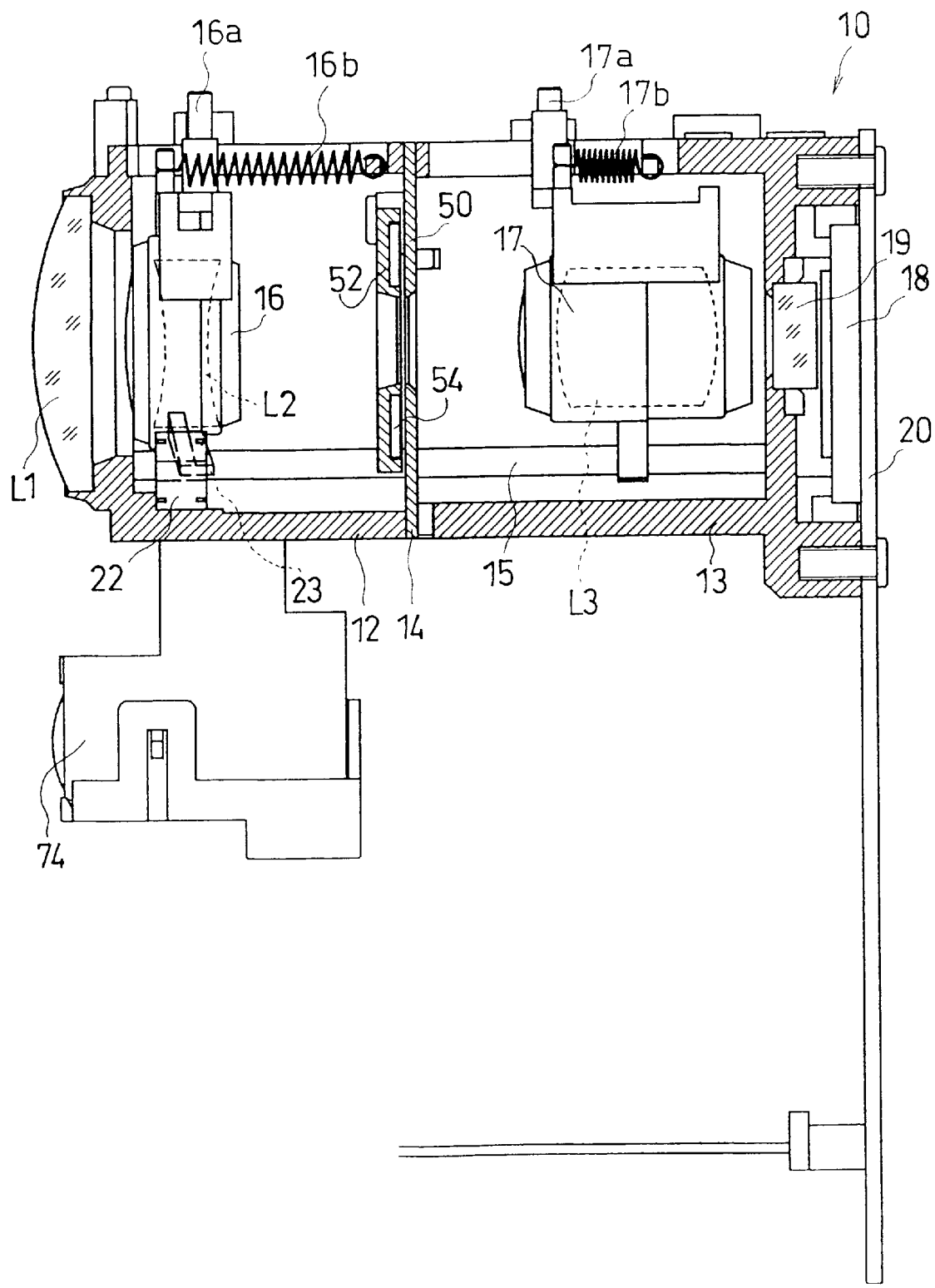
FIG. 7 is a longitudinal sectional view of FIG. 5 at a wide-angle extremity.
Figure 8:
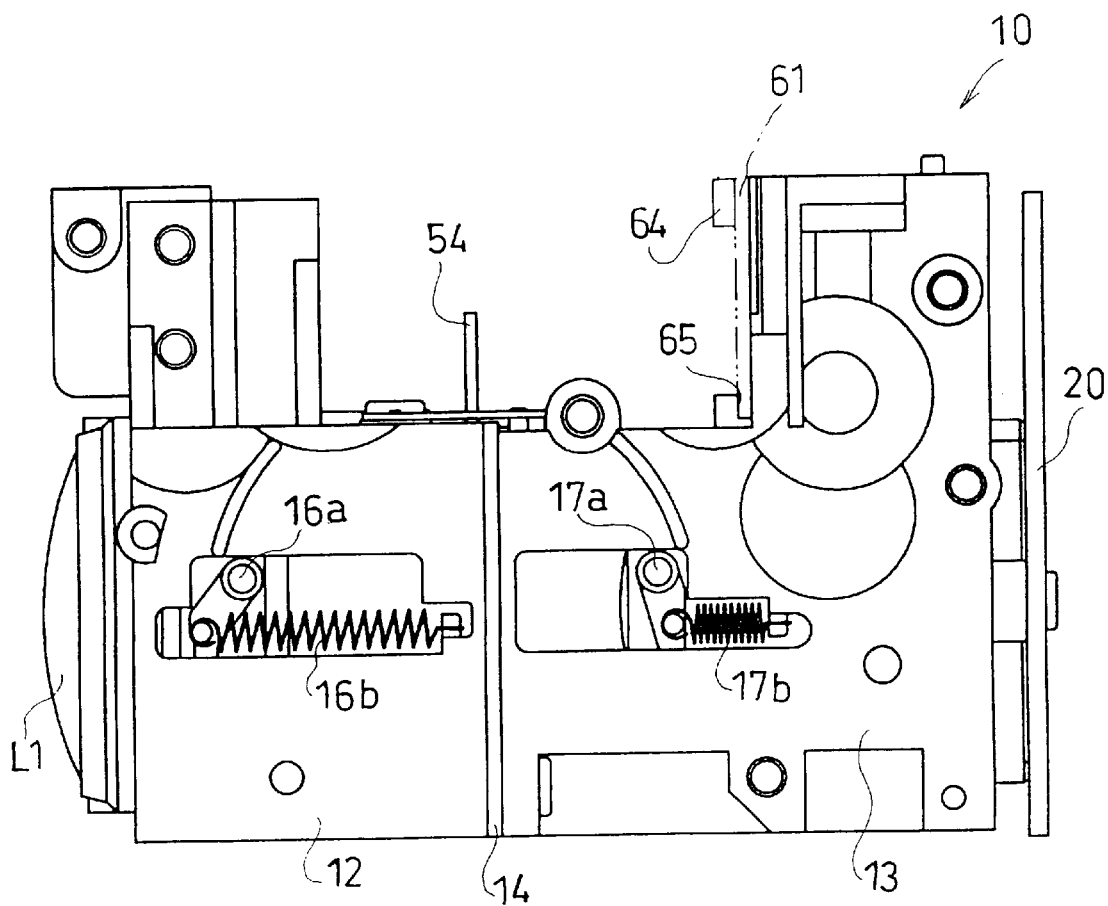
FIG. 8 is an end view viewed from the direction indicated by an arrow VIII in FIG. 5.

A zoom lens barrel according to an embodiment of the present invention is applied to a digital camera using a CCD. The zoom lens system is comprised of three lens groups consisting of a first stationary lens group L1 of positive power, a second movable lens group L2 of negative power, and a third lens group L3 of positive power, as shown in FIGS. 6 and 7. The zoom lens system constitutes a variable focus lens in which the zooming operation is carried out by moving the second and third lens groups L2 and L3, and the focusing operation is carried out by moving the second lens group L2. However no cam groove is used to effect the position control of the second and third lens groups L2 and L3. Namely, the position of the second lens group L2 is controlled, in accordance with set focal length information (data) and detected objected distance information (data) using an open-loop control system; the position of the third lens group L3 is controlled using a closed-loop control system.

Figure 1:
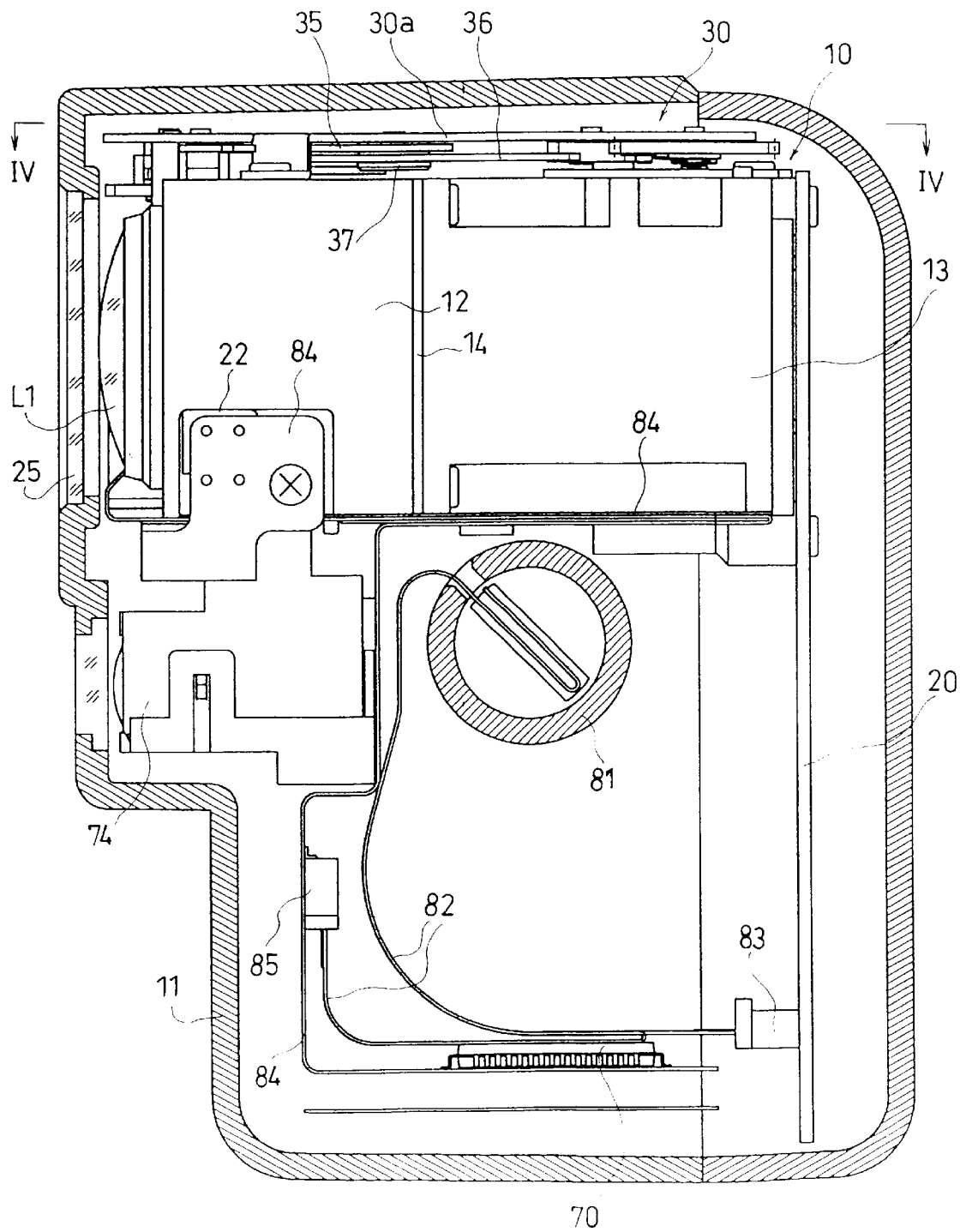
FIG. 1 is a left side view of a zoom lens barrel in which the casing is sectioned.
Figure 2:
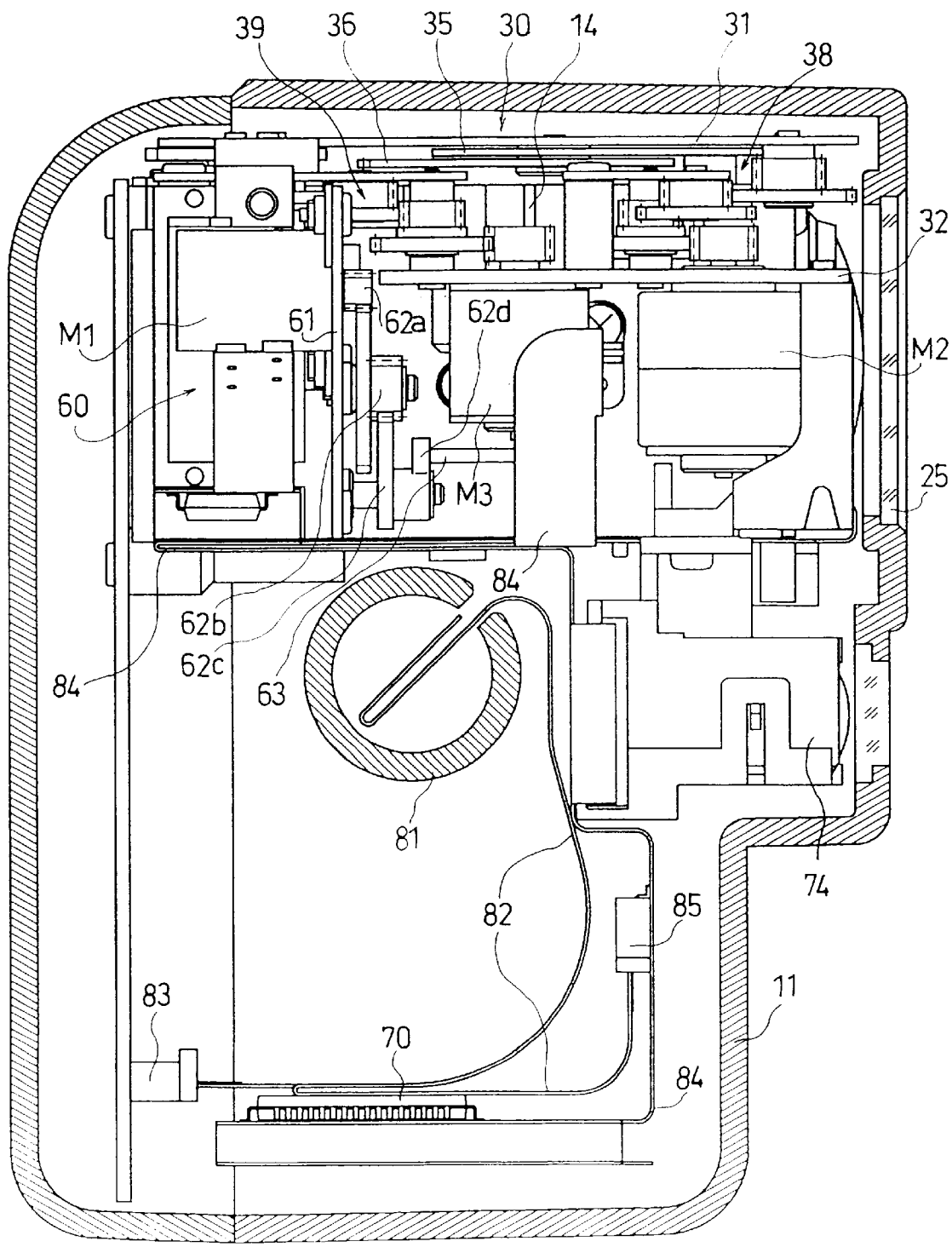
FIG. 2 is a right side view of FIG. 1.
Figure 3:
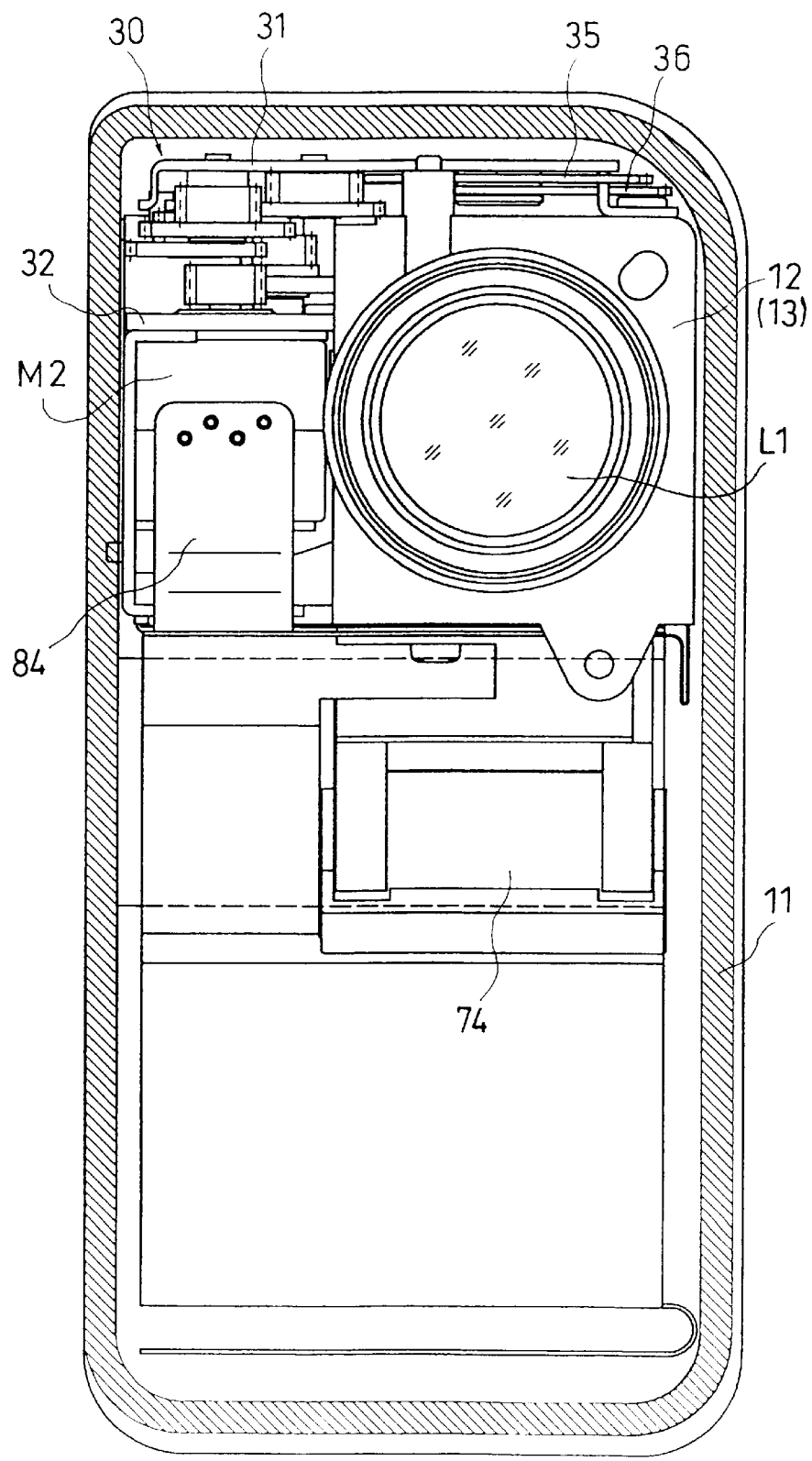
FIG. 3 is a front elevational view of FIG. 1.
Figure 4:
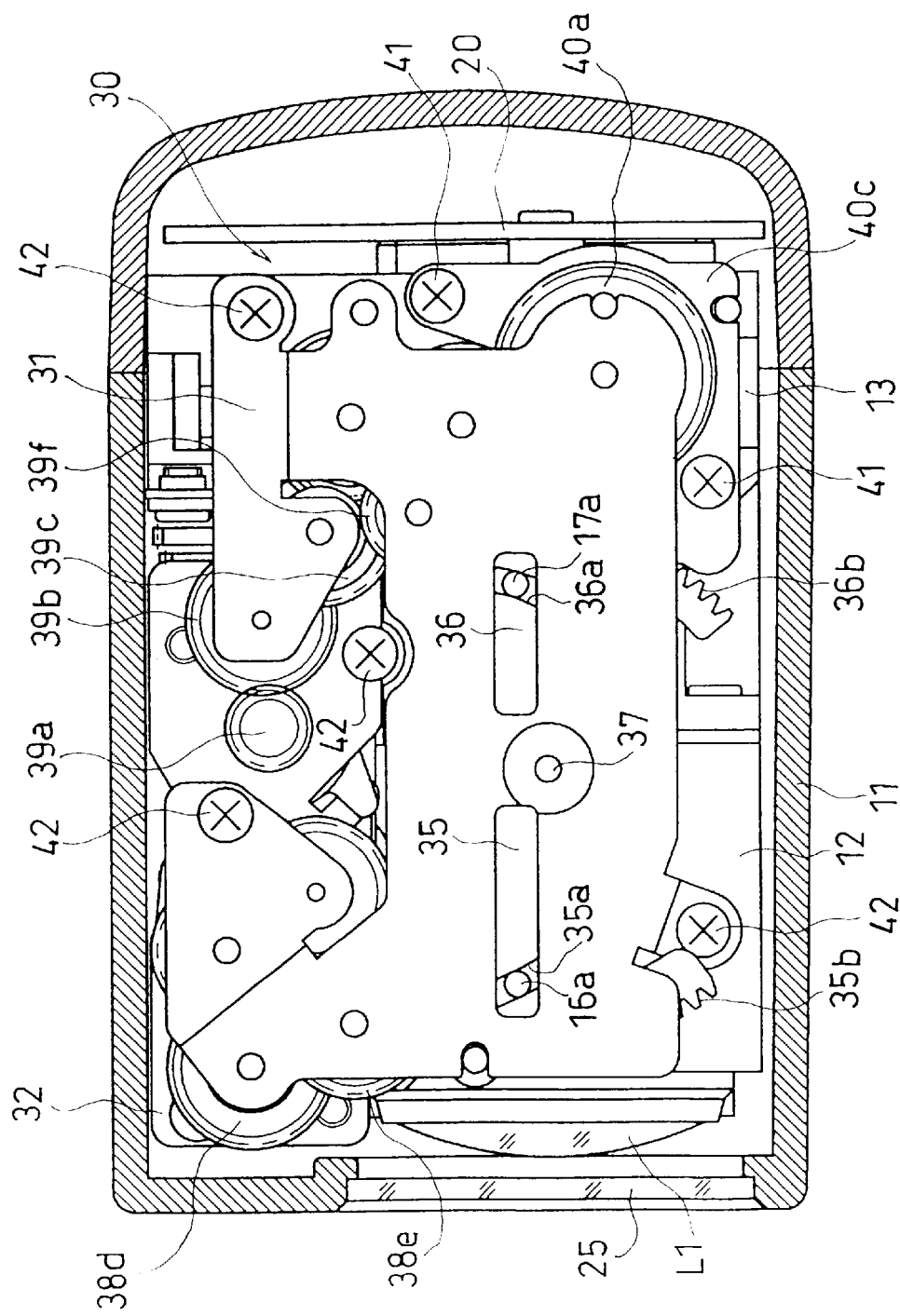
FIG. 4 is a sectional view taken along the line IV—IV in FIG. 1.
Figure 5:
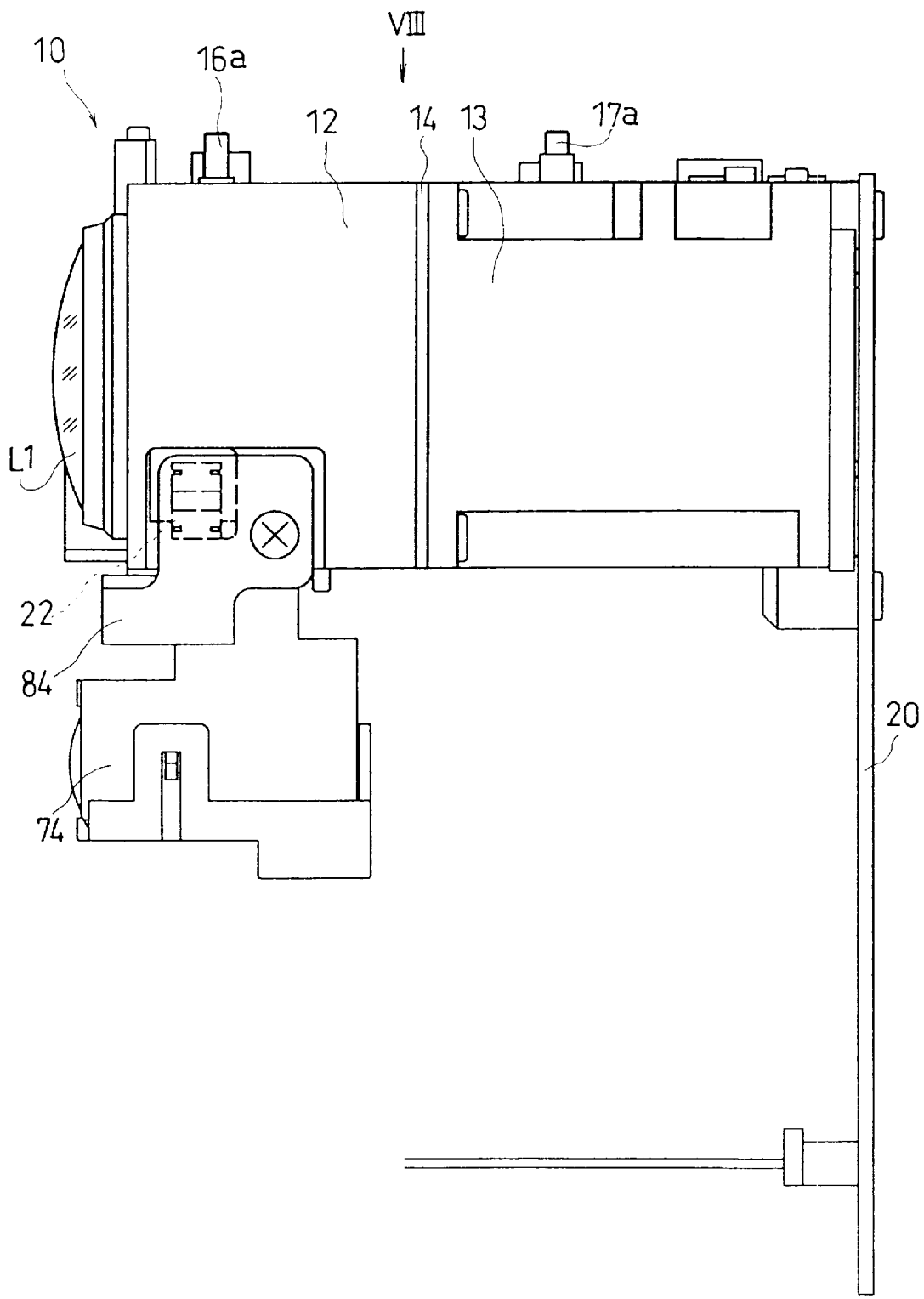
FIG. 5 is a left side view of a lens barrel body before a lens drive unit is incorporated.
Figure 9:
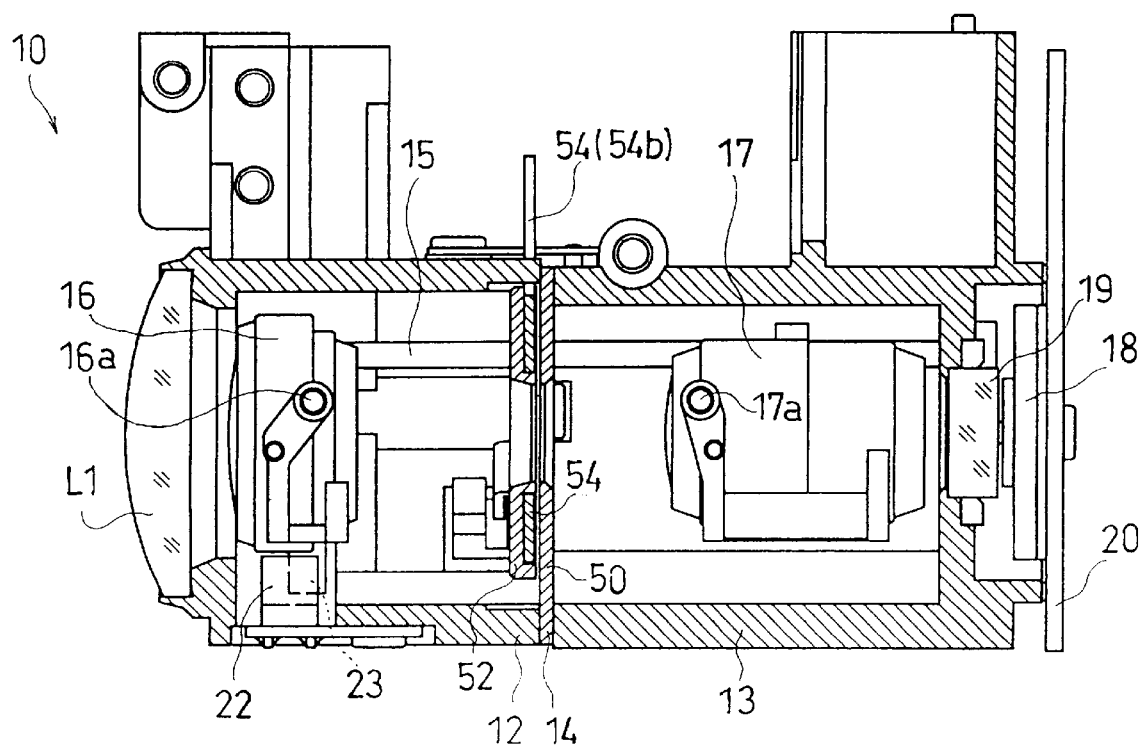
FIG. 9 is a cross sectional view of FIG. 8.

As shown in FIGS. 5 through 9, the lens barrel body 10 located in the lens casing 11 is composed of a front plastic body 12, a rear plastic body 13, and a diaphragm block 14 held between the front and rear plastic bodies 12 and 13. A plurality of guide rods 15 (only one rod is shown in FIGS. 6, 7, 9) are provided extending between the front and rear bodies 12 and 13 in parallel with the optical axis. A second-lens frame 16 which holds the second lens group L2 and a third-lens frame 17 which holds the third lens group L3 are movable, guided by the guide rods 15. The CCD (image pickup device) 18 is provided behind the third lens frame 17 and is provided with a substrate 20 which is secured to the rear body 13. A crystal filter 19 is provided between the third-lens frame 17 and the CCD 18. The casing 11 is provided with a glass cover (plane-parallel plate) 25 (FIGS. 1, 2, 4) secured thereto which is located in front of the first lens group L1.

The second-lens frame 16 and the third-lens frame 17 are respectively provided with a second-lens pin 16a and a third-lens pin 17a. The lens frames 16 and 17 are biased rearwardly (toward the CCD 18) by tensile springs 16b and 17b respectively for removing a backlash.

The front body 12 is provided with a photodetector (origin sensor) 22 to detect the origin of the second lens frame 16 (second lens group L2). The second lens frame 16 is equipped with a dog plate 23 secured thereto to cooperate with the photodetector 22. In the illustrated embodiment, the origin of the second lens group L2 corresponds to an infinite object distance at the wide-angle extremity. When the second lens group L2 is located at the origin, the dog plate 23 interrupts the light from the photodetector 22 to detect the origin. The displacement of the second lens group L2 from the origin is controlled by a lens controller (CPU) 70 (FIG. 18) which controls the number of driving pulses of a second lens pulse motor M2 which drives the second lens group L2. Alternatively, it is also possible to control the displacement of the second lens group L2 from the origin using a pulser.

As may be supposed from the telephoto position shown in FIG. 6 and the wide-angle position shown in FIG. 7, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved in opposite directions.

A lens drive mechanism 30 which drives the second lens frame 16 and the third lens frame 17 in the lens barrel body 10 is assembled as a lens drive unit which is attached to bridge the front body 12 and the rear body 13. The lens drive unit 30 will be discussed below with reference to FIGS. 1 through 4 and FIGS. 10 through 13.

Figure 10:
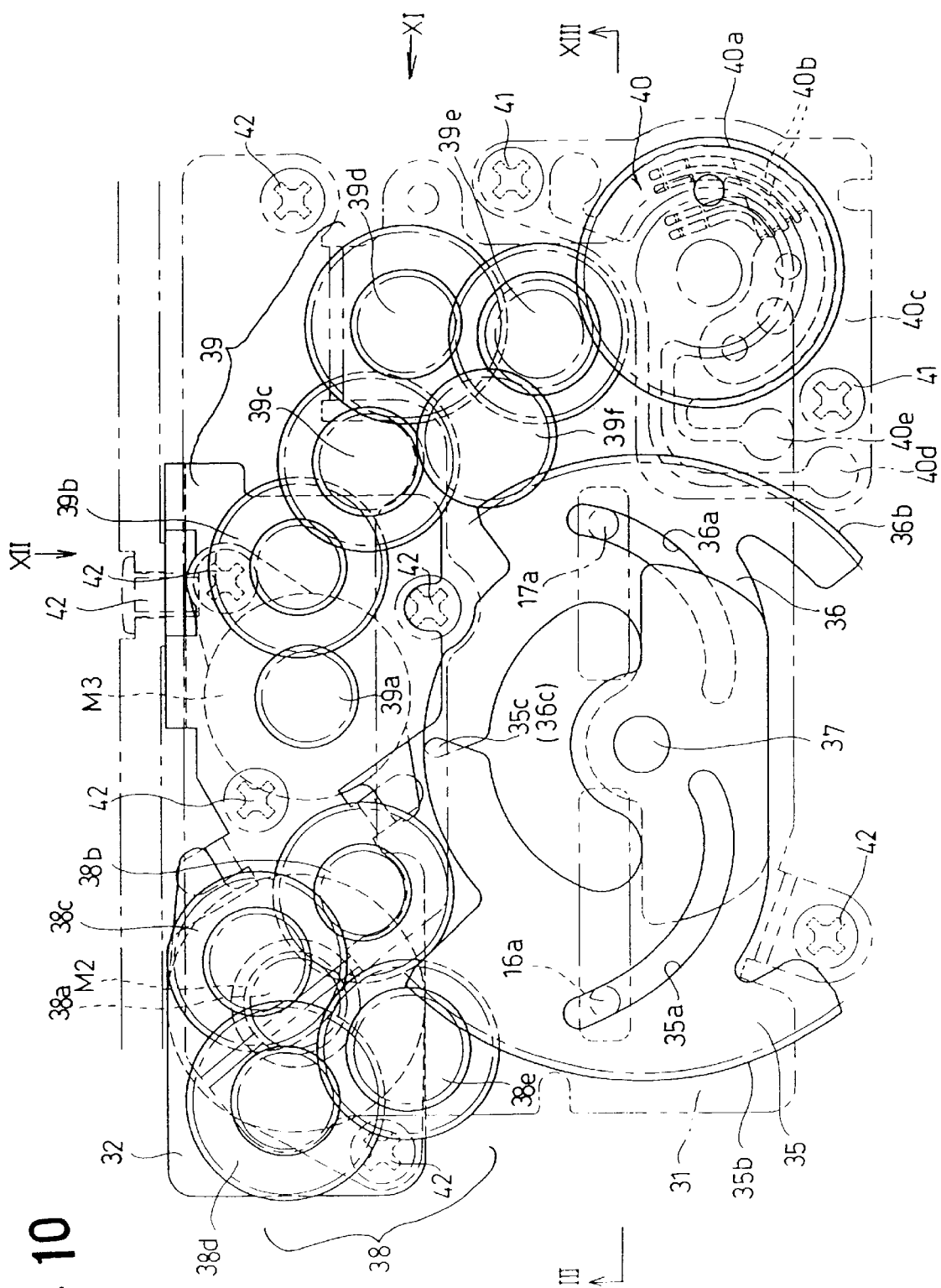
FIG. 10 is a plan view of a lens drive unit.
Figure 11:
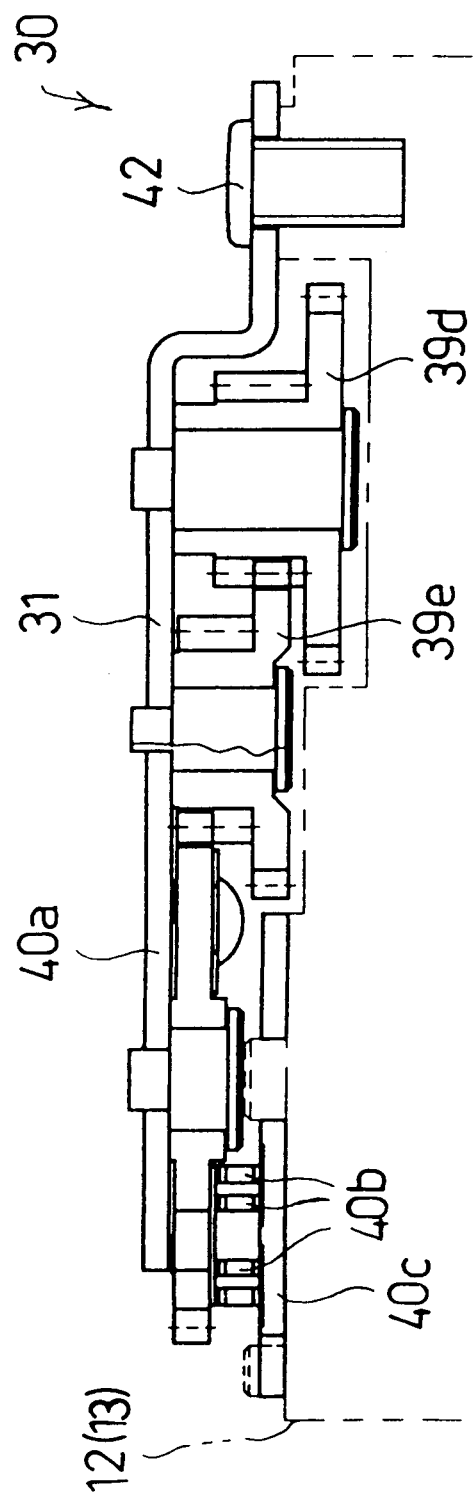
FIG. 11 is an end view viewed from the direction indicated by an arrow XI in FIG. 10.

The lens drive unit 30 is provided with first and second mother plates 31 and 32 which lie stepwise in different heights. In FIG. 10, for clarity, the upper first mother plate 31 is indicated by a dotted line and the lower second mother plate 32 is indicated by a solid line, respectively. The second lens pulse motor M2 and a third lens motor M3 are secured to the lower surface of the lower mother plate 32 so that the drive shafts of the motors M2 and M3 extends in a direction perpendicular to the second mother plate 32. A second-lens drive plate 35 which is provided with a cam groove (lead groove) 35a in which the second lens cam pin 16a of the second lens frame 16 is fitted and a third-lens drive plate 36 which is provided with a cam groove (lead groove) 36a in which the third lens cam pin 17a of the third lens frame 16 is fitted are coaxially pivoted to the first mother plate 31 through a common shaft 37. The second-lens drive plate 35 and the third-lens drive plate 36 are relatively rotatable and lie in parallel planes at different heights. The second lens cam pin 16a and the third lens cam pin 17a are always pressed against the rear surfaces (adjacent to the CCD 18) of the cam grooves 35a and 36a by the tensile springs 16b and 17b, respectively, to eliminate backlash.

A gear mechanism 38 which transmits the rotation of the second lens pulse motor M2 to the second lens drive plate 35, a gear mechanism 39 which transmits the rotation of the third lens motor M3 to the third lens drive plate 36, and a volume mechanism (variable resistor) 40 are provided between the first and second mother plates 31 and 32. A first gear 38a secured to the output shaft of the second lens pulse motor M2 is functionally connected to a sector gear 35b formed on the outer peripheral surface of the second lens drive plate 35 through a second gear 38b, a third gear 38c, a fourth gear 38d and a fifth gear 38e. Each of the gears from the second gear 38b through to the fifth gear 38e are double gears having a pair of coaxial spur gears. The terminal gear 38e of the gear mechanism 38 that is in mesh with the sector gear 35b and the terminal gear 39f of the gear mechanism 39 that is in mesh with the sector gear 36 are provided on opposite sides of the common shaft 37 in the optical axis direction.

A first gear 39a secured to the output shaft of the third lens motor M3 is functionally connected to a sector gear 36b formed on the outer peripheral surface of the third-lens drive plate 36 through a second gear 39b, a third gear 39c, a fourth gear 39d and a fifth gear 39e. Each of gears from the second gear 39b through to the fifth gear 39e are double gears having two spur gears in different axial positions. The fifth gear 39e is in mesh with a sixth gear 39f of the gear mechanism 39 and with a rotatable brush gear 40a of the volume mechanism 40. The brush gear 40a is provided on the rear surface thereof with a brush 40b secured thereto. A resistor plate 40c is secured to the rear body 13 independently of the lens drive unit 30 (before the lens drive unit 30 is attached), so that the resistor 40c comes into contact with the brush 40b. The resistance between two terminals 40d and 40e of the resistor plate 40c varies in accordance with the angular position of the brush gear 40a, and hence, the resistance corresponding to the angular position of the third-lens drive plate 36, i.e., the absolute position of the third lens frame 17 (third lens group L3) can be obtained.

The second-lens drive plate 35 and the third-lens drive plate 36 are coaxially supported by the common shaft 37, as mentioned above. The profiles of the cam grooves 35a and 36a are such that when the second-lens drive plate 35 and the third-lens drive plate 36 rotate in the same direction, i.e., counterclockwise direction in FIG. 10, both the second lens frame 16 (cam pin 16a) and the third lens frame 17 (cam pin 17a) are moved forward. On the other hand, since the second lens frame 16 (second lens group L2) and the third lens frame 17 (third lens group L3) are moved in opposite directions when the focal length varies, as mentioned above, the directions of the rotation of the second-lens drive plate 35 and the third-lens drive plate 36 upon zooming are always opposite when either the focal length is reduced from the telephoto extremity or the focal length is increased from the wide-angle extremity. With this arrangement in which the second-lens drive plate 35 and the third lens drive plate 36 are rotatably mounted to the common shaft 37 and the rotation of the drive plates in opposite directions causes the second and third lens groups L2 and L3 to move in opposite directions, the lens barrel can be miniaturized.

Figure 12:
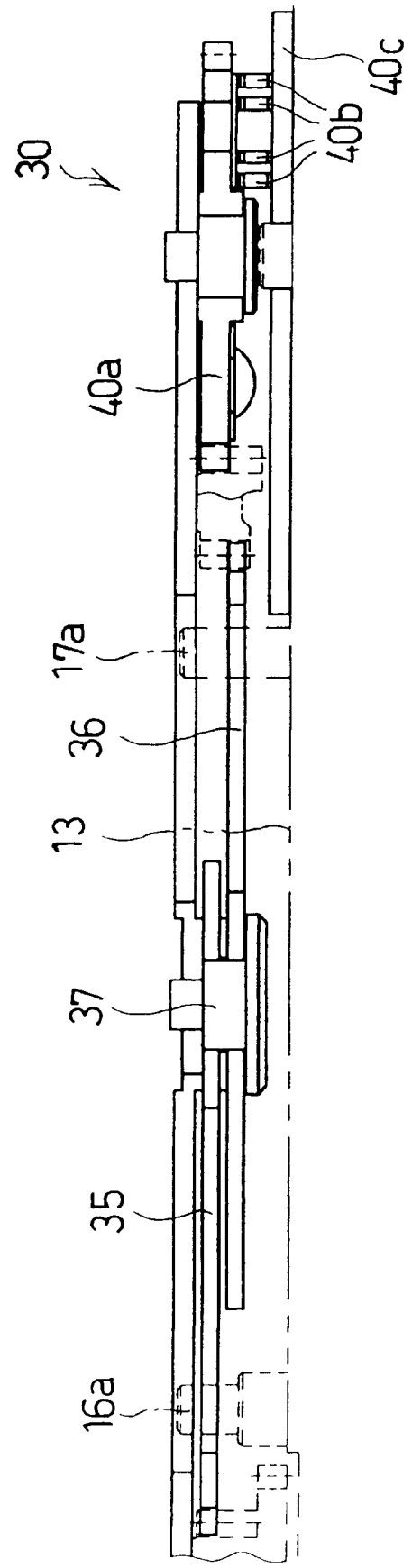
FIG. 12 is an end view viewed from the direction indicated by an arrow XII in FIG. 10.
Figure 13:
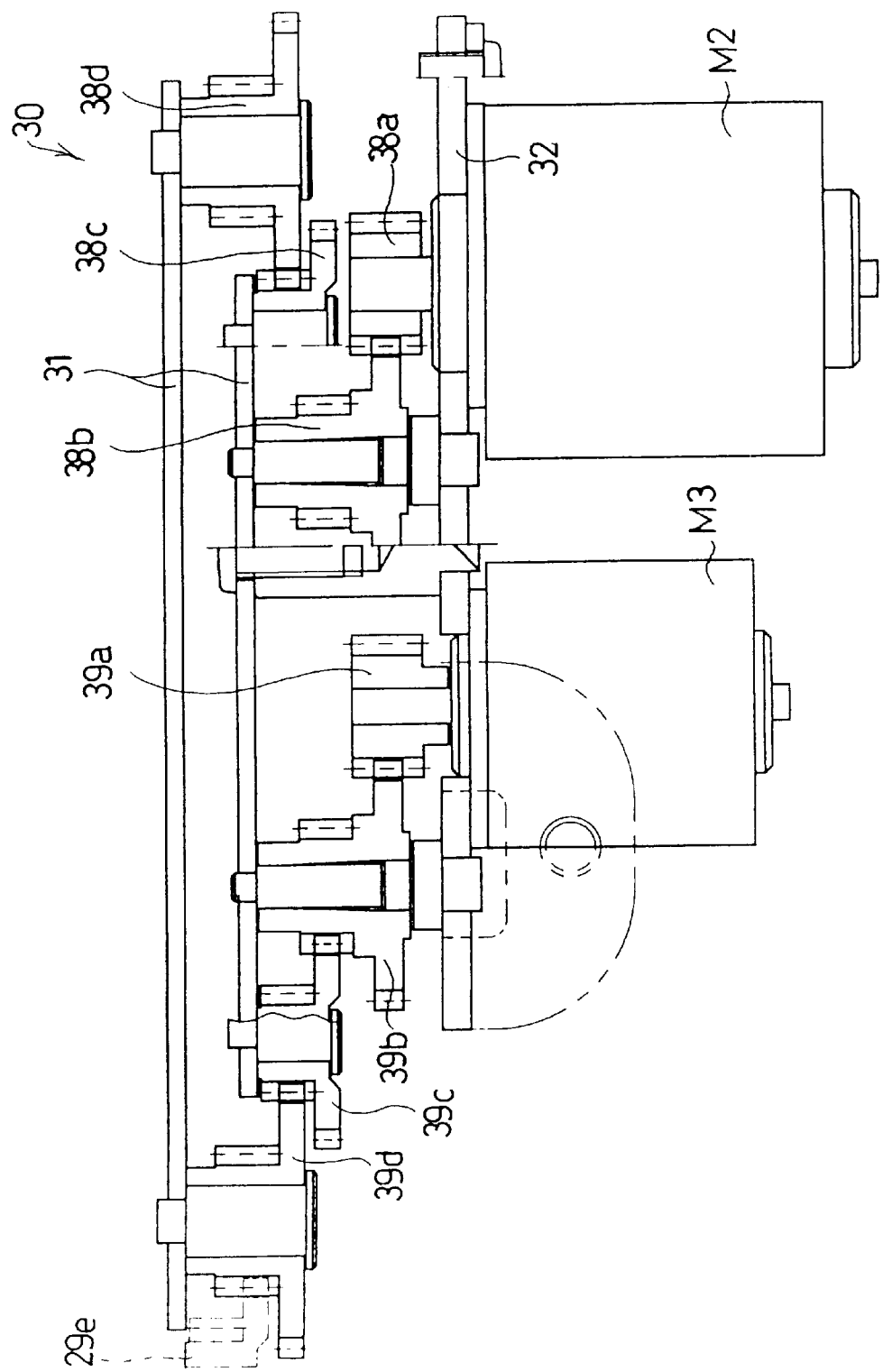
FIG. 13 is a sectional view taken along the line XIII—XIII in FIG. 10.
Figure 14:
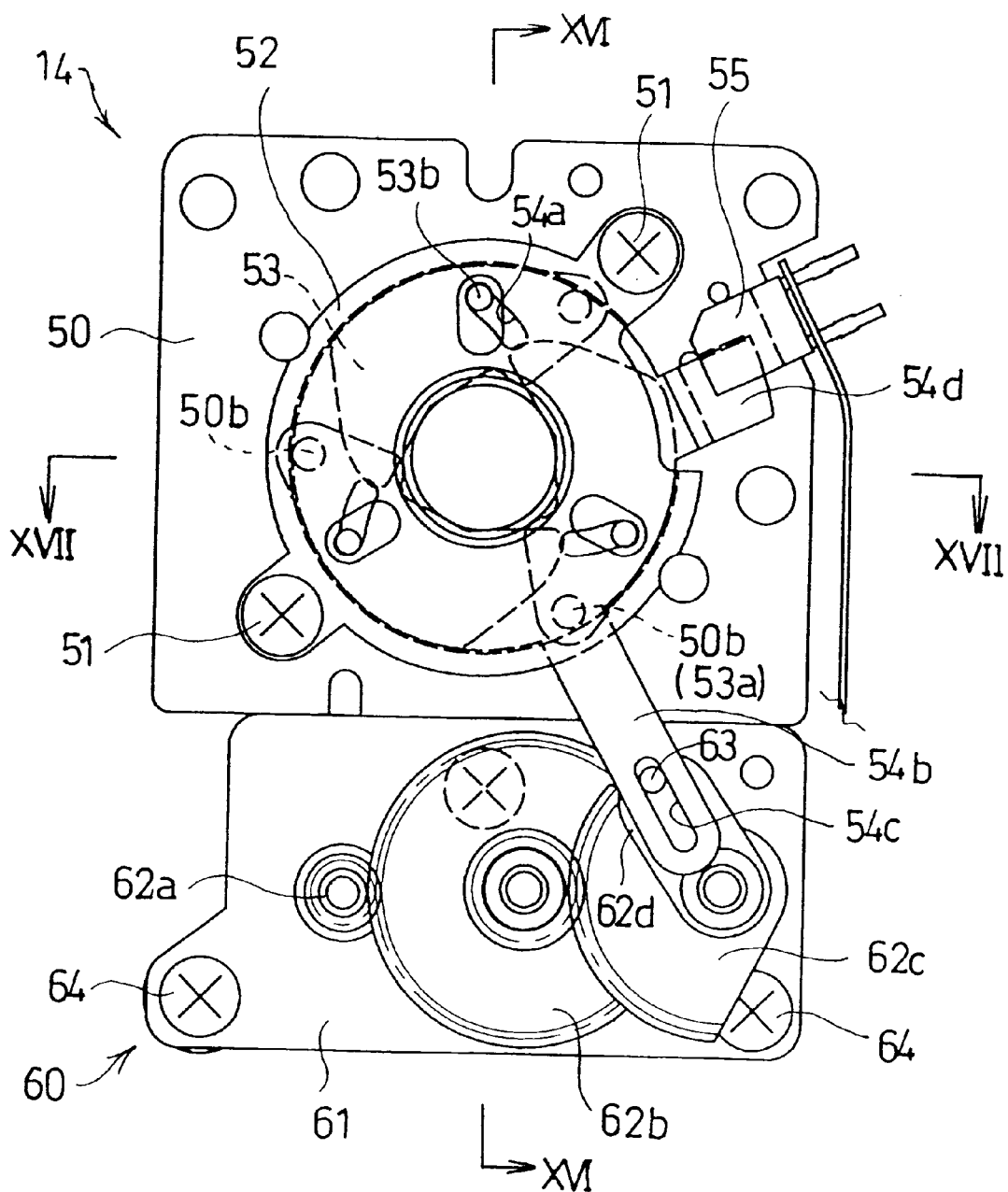
FIG. 14 is a front elevational view of a diaphragm drive unit in a full-open aperture position.
Figure 15:
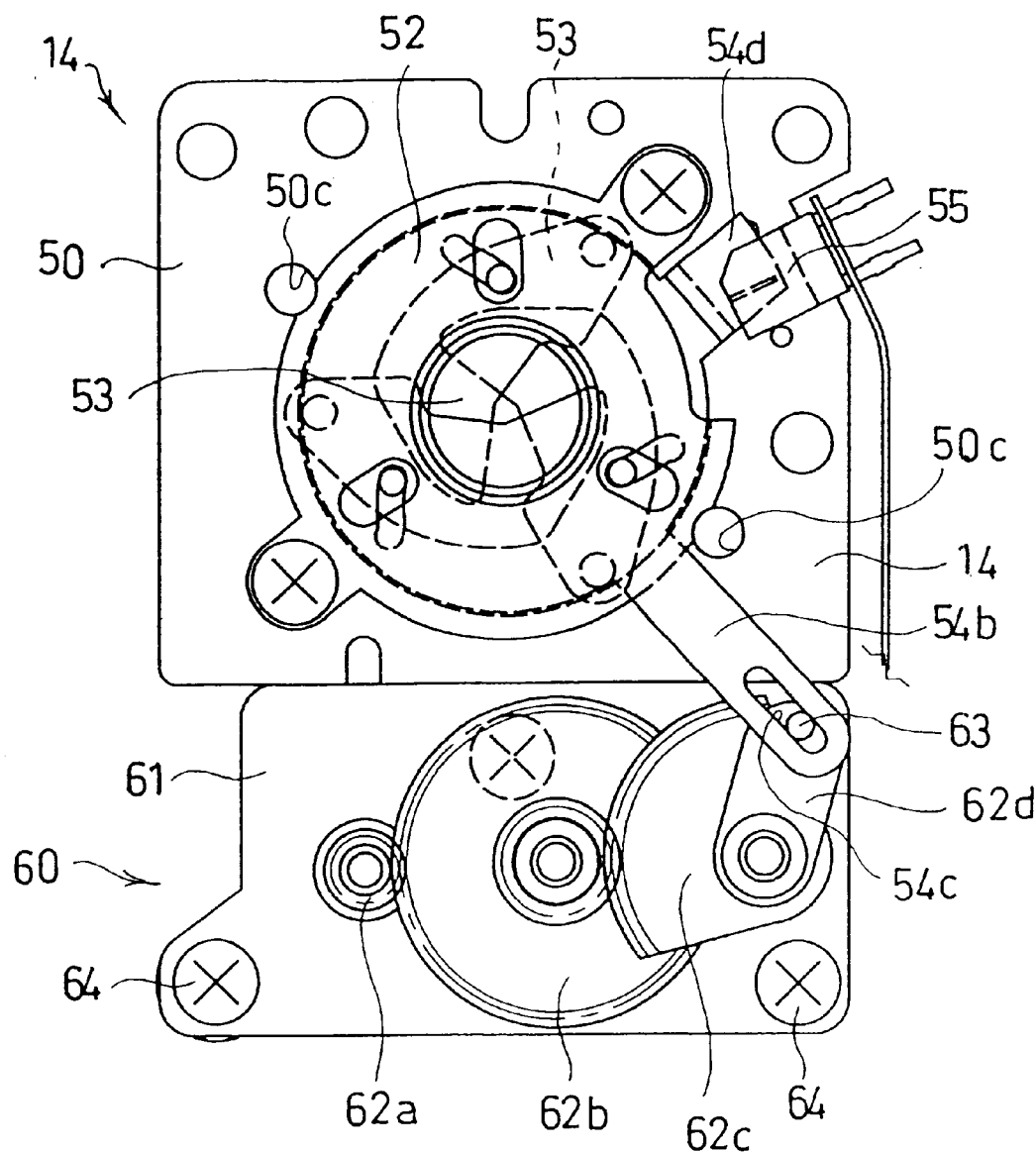
FIG. 15 is a front elevational view of a diaphragm drive unit in a minimum aperture position.
Figure 16:
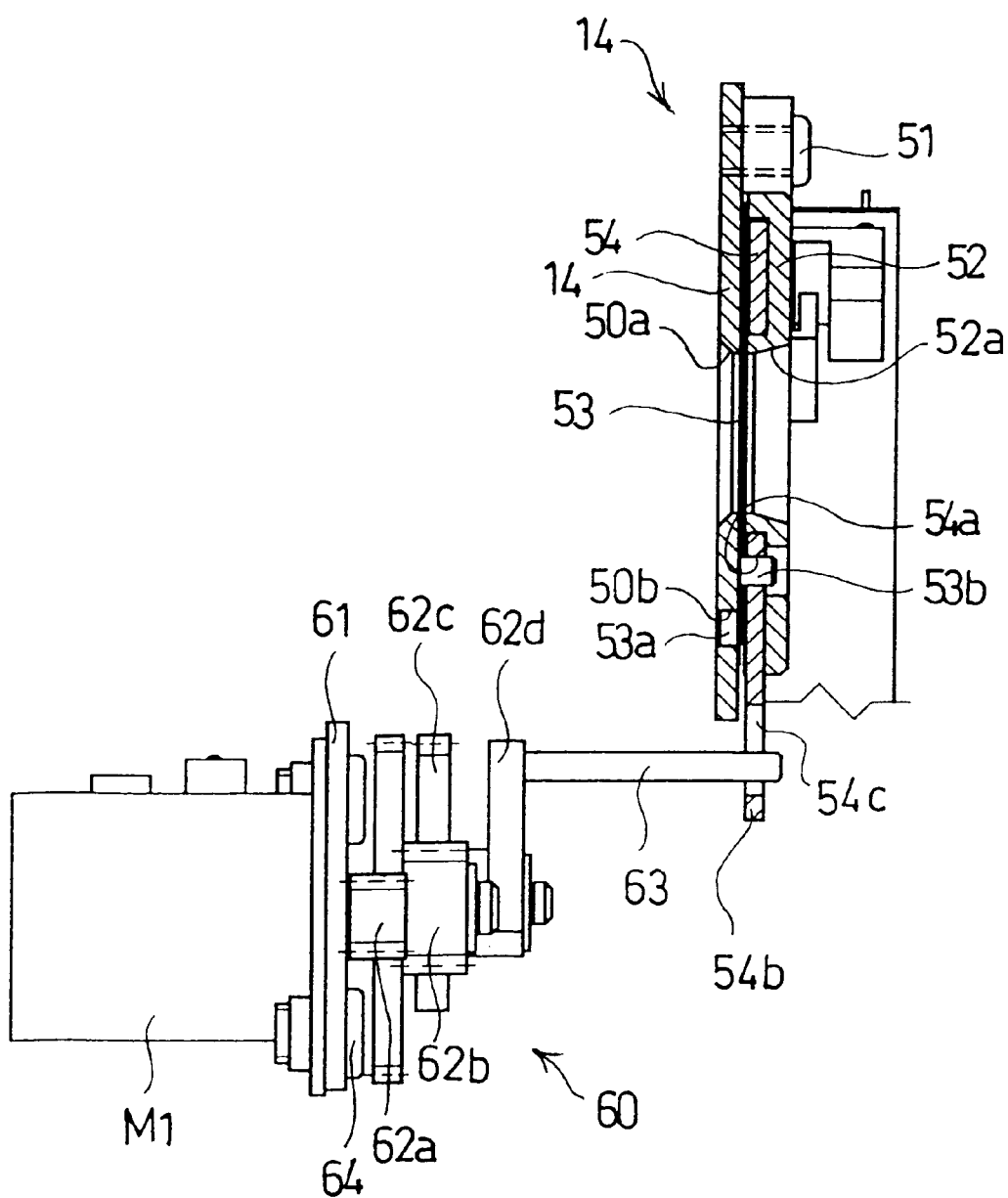
FIG. 16 is a sectional view taken along the line XVI—XVI in FIG. 14.
Figure 17:
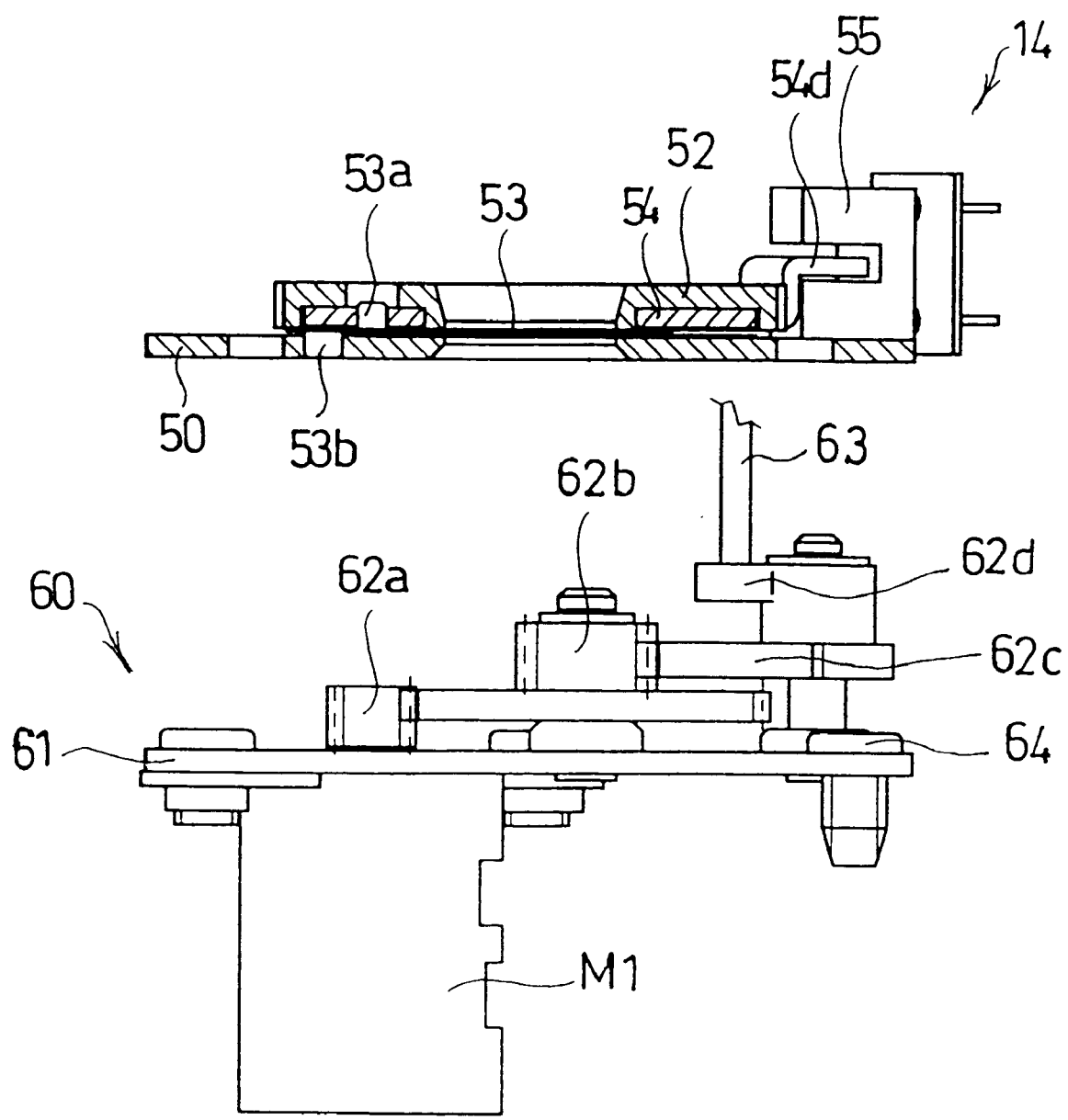
FIG. 17 is a sectional view taken along the line XVII—XVII in FIG. 14.

The second-lens drive plate 35 and the third lens drive plate 36 are located at slightly different positions in the axial direction of the common shaft 37, as can be seen in FIGS. 10 and 12. The drive plates 35 and 36 are in the form of a generally sectoral shape to reduce the weight and size. If the drive plates 35 and 36 can be each made of circular plates (disc shape), no interference between the drive plates will occur at any angular positions. However, since the drive plates 35 and 36 are each in the shape of generally sectional shape, there is a possibility that they might interfere with each other at the front end surfaces thereof in the thickness direction, depending on the angular position, when the sector member deforms in the thickness direction.

To prevent the possibility of such interference, the second-lens drive plate 35 and the third-lens drive plates 35 and 36 are provided on the front ends thereof with wing portions 35*c* and 36*c* which overlap in a plan view when the maximum angular displacement of the drive plates 35 and 36 in opposite directions takes place. FIG. 10 shows a wide-angle position in which the second-lens drive plate 35 is rotated by the maximum angular displacement in the counterclockwise direction, and the third-lens drive plate 36 is rotated by the maximum angular displacement in the clockwise direction, respectively. In this state, the wing portions 35*c* and 36*c* overlap in a plan view. In other words, the drive plates 35 and 36 are each made of a generally sectoral shape plate which is made as small as possible and are provided on the front ends thereof with the wing portions 35*c* and 36*c* which partly overlap in a plan view in any angular position of the lens drive plates 35 and 36, and thus, a smooth rotation of the lens drive plates 35 and 36 can be ensured over the entire angular displacement.

The lens drive unit 30 (except for the resistor plate 40*c*) as constructed above is formed as a separate unit from the lens barrel body 10. The resistor plate 40*c* is secured to the rear body 13 by means of a plurality of screws 41 and thereafter the lens drive unit 30 is secured to the lens barrel body 10 (front body 12 and rear body 13) by means of a plurality of screws 42.

The diaphragm block 14 held between the front body 12 and the rear body 13 and the drive unit 60 thereof will be explained below with reference to FIGS. 14 through 17. A substrate 50 of the diaphragm block 14 and a retainer 52 which is secured to the diaphragm block 14 by screws 51 are provided with apertures 50*a* and 52*a* on the optical axis, respectively. The substrate 50 is provided with a plurality of holes 50*b* formed around the aperture 50*a* in equi-angular distance, in each of which the first of a pair of dowels 53*b* of diaphragm blades 53 is inserted. An opening and closing ring 54 is rotatably provided between the substrate 50 and the retainer 52. The opening and closing ring 54 is provided with a plurality of cam holes 54*a* in equi-angular distance as the holes 50*b* in each of which the second of the pair of the dowels 53*b* of the diaphragm blade 53 is fitted. In the above-mentioned diaphragm mechanism which is per se known, when the opening and closing ring 54 is rotated, the size of the aperture defined by the blades 53 is varied between the full-open position (maximum aperture) and the smallest aperture (minimum aperture).

The substrate 50 is provided with insertion holes 50*c* (FIG. 15) in which the two guide rods 15 of the movable zooming lenses L2 and L3 extend. Upon assembling the front block (body) 12 and the rear block (body) 13, the guide rods 15 are inserted in the insertion holes 50*c* so that the movable zooming lens L2 is supported by the portions of the guide rods 15 located before the substrate 50 and the movable zooming lens L3 is supported by the portions of the guide rods 15 located after the substrate 50, respectively.

The opening and closing ring 54 is provided with a radially extending diaphragm-opening-and-closing arm 54*b* which is in turn provided with a radially extending association groove 54*c*. The photodetector (origin sensor) 55 which detects the origin of the diaphragm mechanism is secured to the diaphragm block 14. The substrate 50 is provided with a dog 54*d* projecting therefrom, corresponding to the photodetector 55. In the illustrated embodiment, the dog 54*d* interrupts light from the photodetector 55 when the opening and closing ring 54 is rotated to the full-open position of the diaphragm (aperture). The diaphragm value (angular displacement of the opening and closing ring 54) when the aperture size is reduced from the full-open position by the opening and closing ring 54 is detected by the lens controller 70 (FIG. 18) which controls the number of driving pulses of the diaphragm pulse motor M1. Alternatively, it is possible to control the displacement from the origin (i.e., the diaphragm value) using a pulser instead of the pulse motor M1.

A diaphragm drive unit 60 as a separate unit is secured to the rear body 13 at a position different from the substrate 50 of the diaphragm block 14 in the optical axis direction and radial direction. The diaphragm pulse motor M1 is secured to the substrate 61 of the diaphragm drive unit 60. A first gear 62*a* secured to the output shaft of the diaphragm pulse motor M1 is connected to the sector gear 62*c* through a second gear 62*b*. The sector gear 62*c* is provided with a drive arm (radial arm) 62*d* integral therewith, which is in turn provided with an association pin 63 which is fitted in the radial association groove 54*c* of the opening and closing ring 54. The second gear 62*b* is a double gear having two spur gears at different axial positions.

The diaphragm block 14 and the diaphragm drive unit 60 are each pre-assembled as a unit. The substrate 50 of the diaphragm block 14 is held between the front and rear bodies 12 and 13. The substrate 61 of the diaphragm drive unit 60 is secured to the rear body 13 by means of a plurality of screws 64, with a state that the association pin 63 is fitted in the radial association groove 54*c* of the opening and closing ring 54. One end of the substrate 61 is inserted in a holding groove 65 (FIG. 8) of the rear body 13.

Figure 18:
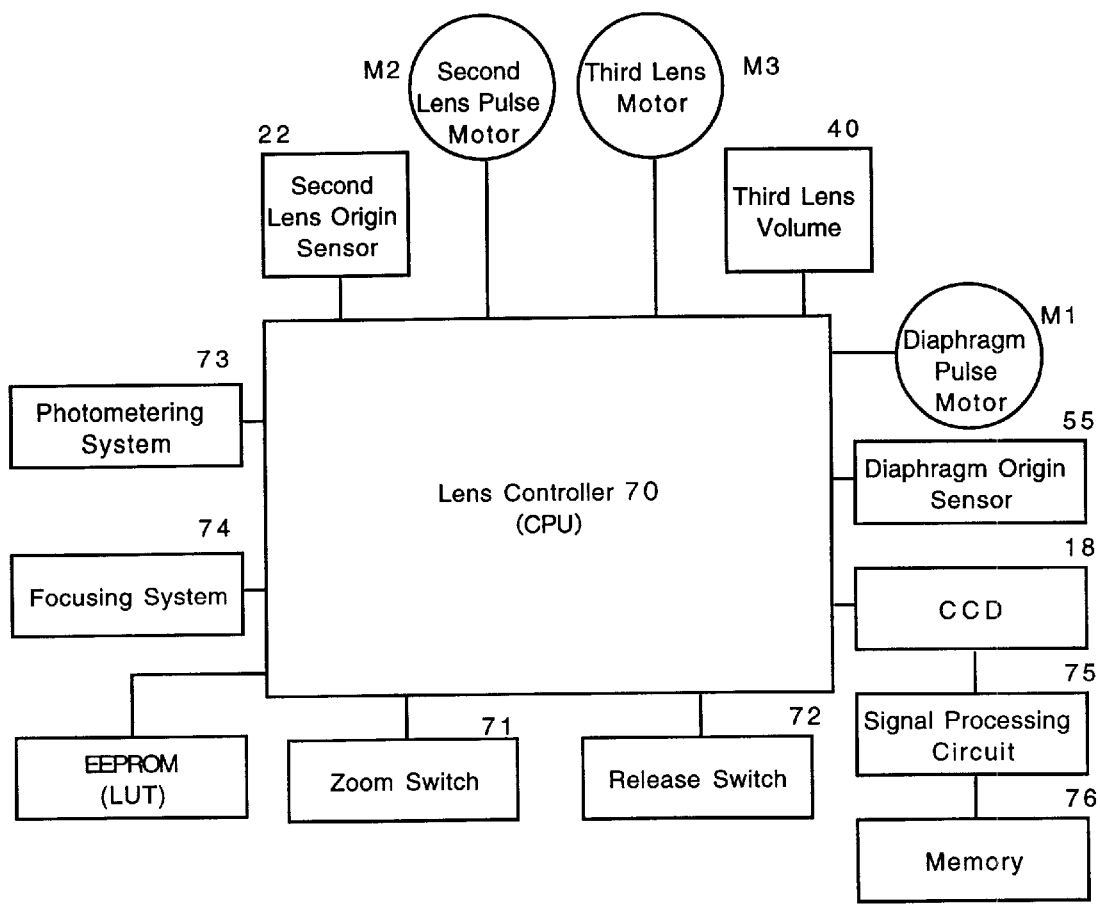
FIG. 18 is a block diagram of a control system in a zoom lens barrel according to the present invention.

FIG. 18 shows a control system of the zoom lens barrel constructed above. Connected to the lens controller (CPU) 70 is the diaphragm pulse motor M1, the second lens pulse motor M2, the third lens motor M3, the third lens volume 40, the diaphragm origin detector 55, the CCD 18, a zoom switch 71, a release switch 72, a photometering device 73, an object distance detecting device 74 and an EEPROM. In general, the CCD 18 can constitute the photometering device 73. The object distance detecting device 74 can be either of a passive type or an active type. In the embodiment illustrated in FIGS. 1 through 3, the object distance detecting device 74 is a passive system. Image data formed on the CCD 18 is converted to an electric signal which is recorded in the memory 76 through the signal processing circuit 75.

The position of the third lens group L3 detected by the third lens volume 40 is an absolute value, and hence the set focal length is determined with reference to the position of the third lens group. When the operation force of the zoom switch 71 is released, it does not matter if the focus condition is out of focus.

When the release switch 72 is depressed by half a step, the photometering device 73 and the object distance detecting device 74 are activated to obtain object brightness data and object distance data. When the release switch 72 is depressed by a full step, the image pickup operation is carried out by the CCD 18. Before the release switch 72 is fully depressed, the diaphragm value is set in accordance with the object brightness data detected by the photometering device 73 by the diaphragm pulse motor M1, the diaphragm origin sensor 55 and the lens controller 70; the second lens group L2 is moved to a in-focus position in accordance with the set focal length data and the object distance data detected by the object distance detecting device 74, the second lens pulse motor M2, the second lens origin sensor 22 and the lens controller 70. Namely, when the absolute position of the third lens group L3 is determined in accordance with the focal length set by the zoom switch 71, the position of the second lens group L2 can be determined in accordance with the set focal length and the object distance data detected by the object distance detecting device 74. Thus, an in-focus object image is formed on the CCD 18, so that the image pickup operation can be carried out.

According to the present invention, the drive apparatus is comprised of separate units of a diaphragm block which constitutes the mechanism portion for opening and closing the diaphragm blades and a diaphragm drive unit for driving the same. The diaphragm block is held between the front and rear lens barrel blocks. The diaphragm drive unit is secured to the front or rear lens barrel block so that the association pin is fitted in the association groove of the diaphragm-opening-and-closing arm of the diaphragm block. Consequently, the motor-driven diaphragm apparatus for a lens barrel can be prepared as a subassembly, thus resulting in an easy assembling operation.

What is claimed is:

1. A motor-driven diaphragm apparatus for a lens barrel having a plurality of lens groups and a diaphragm mechanism, comprising:

a diaphragm block provided with a plurality of diaphragm blades and a diaphragm-opening-and-closing ring which opens and closes an aperture defined by the diaphragm blades;

said diaphragm-opening-and-closing ring being integrally provided with a diaphragm-opening-and-closing arm that projects from the diaphragm block and that is provided with a radial association groove for the diaphragm-opening-and-closing ring;

front and rear lens barrel blocks which support the lens groups;

said diaphragm block being held between the front and rear lens barrel blocks so that the diaphragm-opening-and-closing arm and the association groove project outwardly; and a diaphragm drive unit separate from the diaphragm block and the front and rear lens barrel blocks, said diaphragm drive unit having an association pin which can be fitted in the association groove of the diaphragm-opening-and-closing arm and a drive system including a motor for driving the association pin;

wherein said diaphragm drive unit is secured to the front or rear lens barrel block in a state that the association pin is fitted in the association groove of the diaphragm-opening-and-closing arm of the diaphragm block.

2. A motor-driven diaphragm apparatus for a lens barrel according to claim 1, wherein said diaphragm block is provided with a substrate which is held between the front and rear lens barrel blocks.

3. A motor-driven diaphragm apparatus for lens barrel according to claim 2, further comprising a guide rod which guides the lens groups to move linearly in an optical axis direction, wherein said substrate is provided with an insertion hole in which the guide rod is inserted.

4. A motor-driven diaphragm apparatus for a lens barrel according to claim 3, wherein said guide rod supports movable lens groups on opposite sides of the substrate.

* * * * *

UNITED STATES PATENT AND TRADEMARK OFFICE
CERTIFICATE OF CORRECTION

PATENT NO.   : 5,926,324
DATED        : July 20, 1999
INVENTOR(S)  : M. OONO

It is certified that error appears in the above-identified patent and that said Letters Patent is hereby corrected as shown below:

On cover page, item [73], Assignee, "Asahi Kogaku Kabushiki Kaisha" should be ---Asahi Kogaku Kogyo Kabushiki Kaisha---.

Signed and Sealed this

Eighth Day of August, 2000

*Attest:*

Q. TODD DICKINSON

*Attesting Officer*     *Director of Patents and Trademarks*